United States Patent
Pan

(10) Patent No.: US 7,864,488 B1
(45) Date of Patent: Jan. 4, 2011

(54) SUSPENSION ASSEMBLY INCLUDING A DIMPLE THAT CONTACTS A FLEXURE TONGUE DIELECTRIC LAYER THROUGH A HOLE IN A FLEXURE TONGUE STRUCTURAL LAYER

(75) Inventor: Tzong-Shii Pan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 879 days.

(21) Appl. No.: 11/717,299

(22) Filed: Mar. 13, 2007

(51) Int. Cl.
*G11B 5/58* (2006.01)
*G11B 21/20* (2006.01)

(52) U.S. Cl. .................. 360/245.1; 360/244.3
(58) Field of Classification Search ............ 60/245.1, 60/245.4, 245.3, 245.8, 245, 244.2, 244.3
See application file for complete search history.

(56) References Cited

U.S. PATENT DOCUMENTS

| | | | |
|---|---|---|---|
| 5,006,946 A * | 4/1991 | Matsuzaki | 360/245.9 |
| 5,282,103 A | 1/1994 | Hatch et al. | |
| 5,299,081 A | 3/1994 | Hatch et al. | |
| 5,581,422 A * | 12/1996 | Umehara | 360/97.01 |
| 5,617,274 A | 4/1997 | Ruiz | |
| 5,839,193 A * | 11/1998 | Bennin et al. | 29/896.9 |
| 5,896,248 A * | 4/1999 | Hanrahan et al. | 360/234.5 |
| 5,901,014 A * | 5/1999 | Hiraoka et al. | 360/234.5 |
| 5,901,430 A | 5/1999 | Ziegler et al. | |
| 5,973,884 A | 10/1999 | Hagen | |
| 6,011,671 A | 1/2000 | Masse et al. | |
| 6,157,520 A | 12/2000 | Mangold et al. | |
| 6,421,206 B1 | 7/2002 | Khan | |
| 6,549,376 B1 * | 4/2003 | Scura et al. | 360/245.3 |
| 6,636,382 B2 | 10/2003 | Shiraishi | |
| 6,813,120 B1 * | 11/2004 | Misso | 360/265.7 |
| 6,894,873 B2 | 5/2005 | Kasajima et al. | |
| 7,046,483 B2 | 5/2006 | Erpelding | |
| 2004/0008449 A1 | 1/2004 | Girard | |
| 2008/0239577 A1 * | 10/2008 | Zeng et al. | 360/245.1 |

* cited by examiner

*Primary Examiner*—Julie Anne Watko

(57) ABSTRACT

A suspension assembly includes a load beam having a protruding dimple and a laminate flexure. The laminate flexure includes a structural layer that is attached to the load beam, and a dielectric layer. The laminate flexure includes a flexure tongue for mounting a head. The flexure tongue includes the structural layer and the dielectric layer and a hole that extends through the structural layer but not through the dielectric layer. The dimple contacts the dielectric layer via the hole.

16 Claims, 3 Drawing Sheets

SUSPENSION ASSEMBLY INCLUDING A DIMPLE THAT CONTACTS A FLEXURE TONGUE DIELECTRIC LAYER THROUGH A HOLE IN A FLEXURE TONGUE STRUCTURAL LAYER

FIELD OF THE INVENTION

The present invention relates generally to information storage devices, and in particular to stand-off arrangements on flexure tongues of head-gimbal assemblies.

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which the disk is mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The head stack assembly typically includes an actuator, at least one head gimbal assembly (HGA), and a flex cable assembly. During operation of the disk drive, the actuator must rotate to position the HGA adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

An HGA includes a suspension assembly that holds the head. FIGS. 1 and 2 depict a suspension assembly 100 according to the prior art. The suspension assembly 100 includes a load beam 110 that includes a dimple 112 and may also include a loading tab 114. The suspension assembly 100 also includes a flexure 120 that includes a tongue 130 to which the head (not shown to facilitate viewing of the tongue 130) is adhered.

The flexure 120 is generally comprised of a laminate material that typically includes three layers: a structural layer 122, a dielectric layer 124, and a conductive layer 126. The conductive layer 126 includes leads that terminate near the head (e.g. terminal 138) to facilitate electrical connection. The dielectric layer 124 typically includes stand-offs (e.g. stand-off 140) on the tongue 130 to help control the spacing and maintain parallelism between a head and the tongue 130 while the head is adhered to the tongue 130. The structural layer 122 typically includes arms 134, also known as "outrigger" arms. Flexibility in arms 134 allows the tongue 130 to pivot about dimple 112 to allow pitch and roll motions of the head, although motion of the tongue 130 may be limited by a tongue limiter 136.

The dimple 112 typically comprises the same material as, and makes contact with, the structural layer 122. Often, the dimple 112 and the structural layer 122 both comprise stainless steel. The area of contact between the dimple 112 and the structural layer 122 is typically small because the dimple 112 is typically of hemispherical shape. Due to the small area of contact and the material similarity, fretting can develop at the location of dimple-flexure contact. Such fretting can lead to corrosion, which in turn can create undesirable contamination (typically iron oxide) within the disk drive. Thus, there is a need in the art for an improved flexure design that can reduce fretting and/or corrosion at the dimple-flexure contact location.

SUMMARY

A suspension assembly is disclosed and claimed. The suspension assembly includes a load beam having a protruding dimple and a laminate flexure. The laminate flexure includes a structural layer that is attached to the load beam, and a dielectric layer. The laminate flexure includes a flexure tongue for mounting a head. The flexure tongue includes the structural layer and the dielectric layer and a hole that extends through the structural layer but not through the dielectric layer. The dimple contacts the dielectric layer via the hole.

DESCRIPTION OF THE PREFERRED EMBODIMENTS

Figures 1, 2:
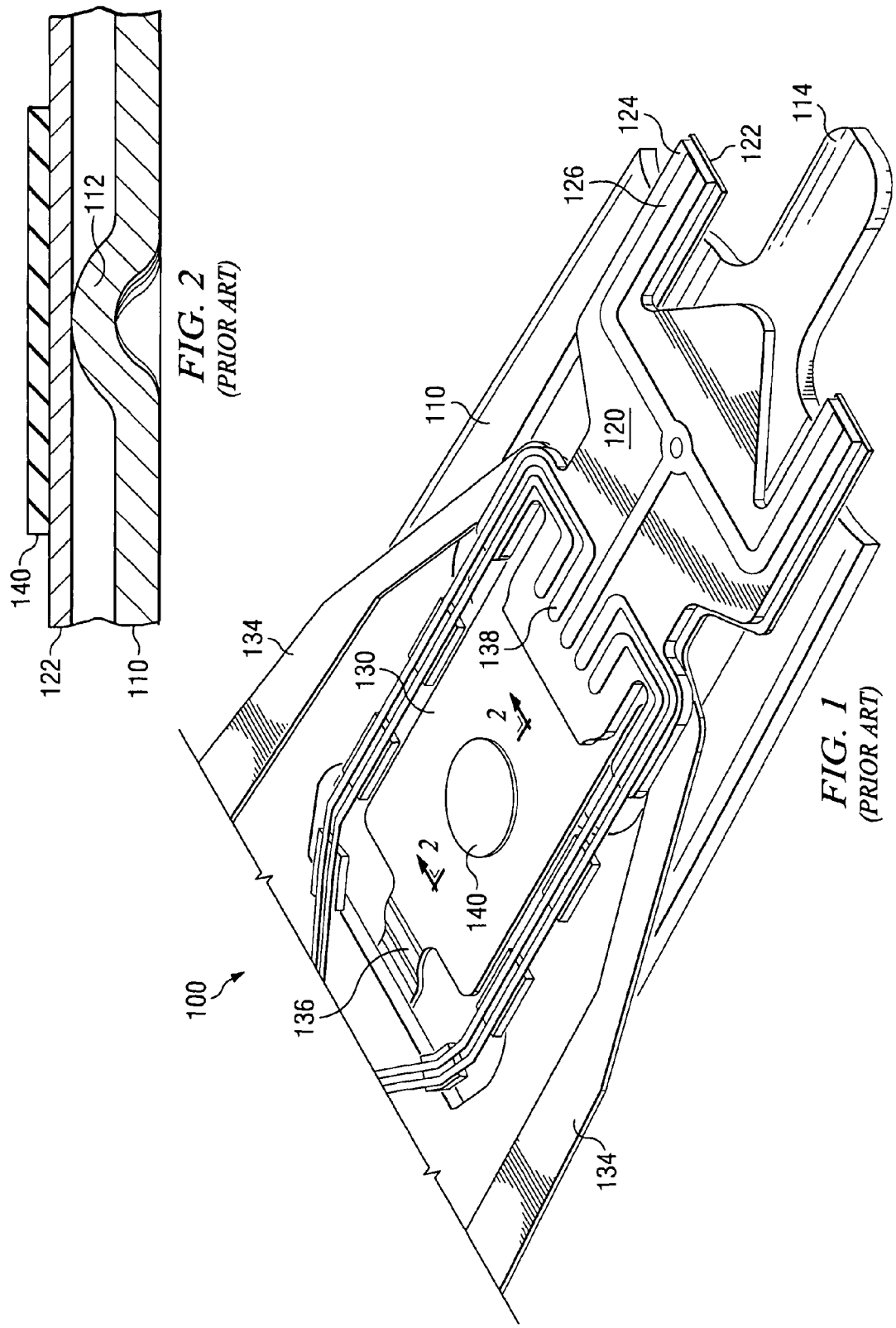
FIG. 1 depicts a suspension assembly according to the prior art.
FIG. 2 depicts a cross section of the suspension assembly of FIG. 1, taken at the location of cross section designated as 2-2 in FIG. 1.
Figure 4:
FIG. 4 depicts a cross section of the suspension assembly of FIG. 3, taken at the location of cross section designated as 4-4 in FIG. 3.
Figure 3:
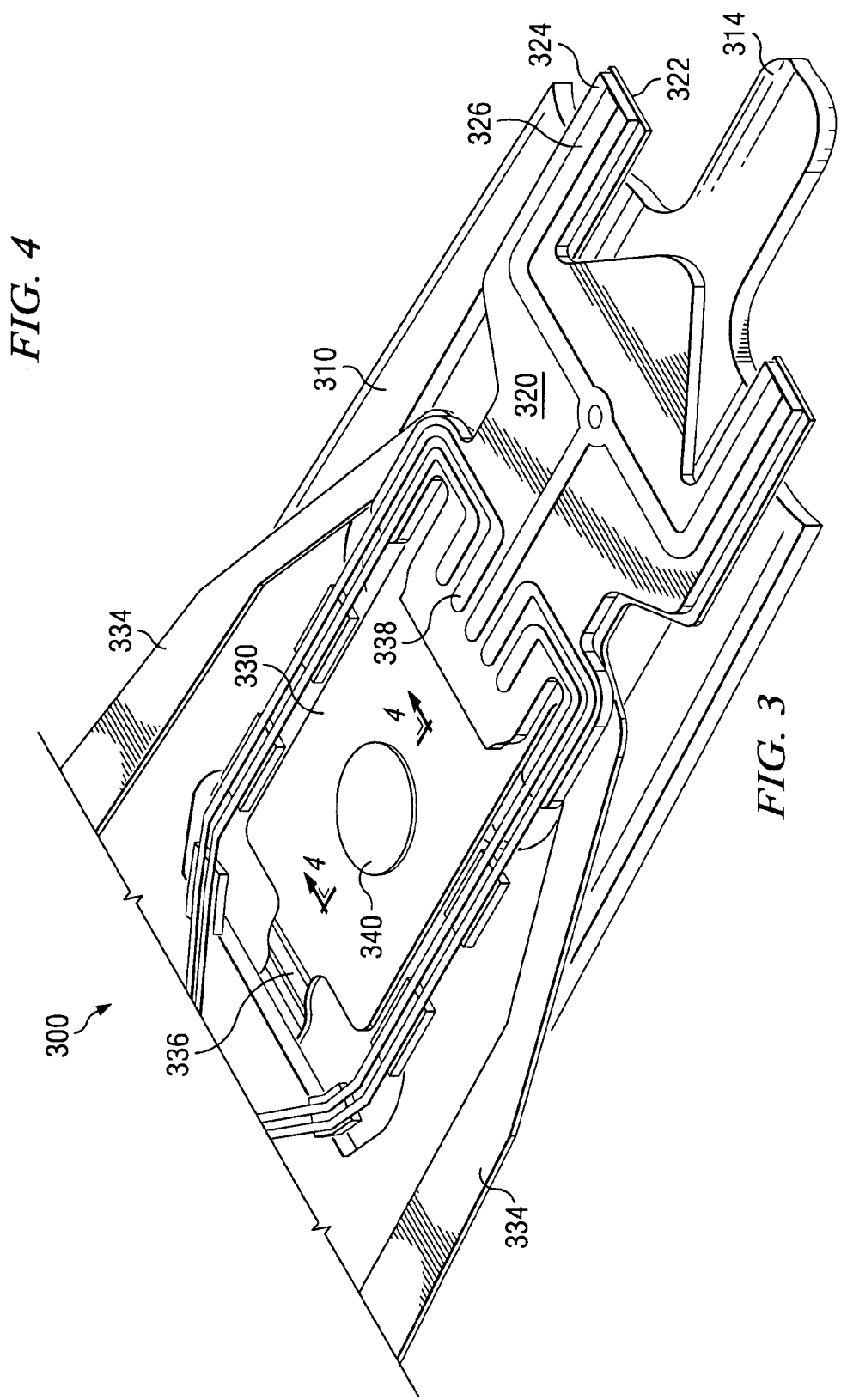
FIG. 3 depicts a suspension assembly according to an embodiment of the present invention.

FIGS. 3 and 4 depict a suspension assembly 300 according to an exemplary embodiment of the present invention. Suspension assembly 300 includes a load beam 310 that provides lateral stiffness and a vertical preload to the structure of suspension assembly 300. The load beam 310 may be fabricated from stainless steel, and may include a lift tab 314 for loading (or unloading) the head onto (or away from) a surface of a data storage media. In magnetic disk drive applications, the data storage media could be a spinning thin-film magnetic disk, for example.

Suspension assembly 300 also includes a flexure 320. The flexure 320 includes a tongue 330 to which the head (not shown to facilitate viewing of the tongue 330) is adhered. The flexure 320 includes two outrigger arms 334 that provide flexibility to allow the tongue 330 to undergo pitch and roll rotations without excessive associated torques. A dimple 312 in the load beam 310 forms the pivot point for the pitch and roll rotations and also helps constrain relative translations of the tongue 330. In the embodiment of FIG. 3, relative translation of the tongue 330 is also limited by a tongue limiter 336 during mechanical shocks. In certain embodiments, the dimple 312 may have a protrusion height in the range 65 to 90 microns. Preferably, the dimple 312 is formed in the load beam 310 by stamping so that the local material thickness of the load beam 310 is not significantly affected and a concave or recessed region appears on the opposing side of the load beam 310 at the location of the dimple 312. Alternatively, the dimple 312 might be fabricated-in-place by hardening a liquid drop of solder, adhesive, or plastic material. In the case of low protrusion height dimples, coining might also be a fabrication option. The dimple might also fabricated as an insert, and/or as an injection molded component.

Both the tongue 330 and the outrigger arms 334 may be fabricated from a structural layer 322 of the flexure 320 that is attached to the load beam 310. For example, the structural layer 322 may comprise stainless steel and may be spot-welded to the load beam 310 in a region of the load beam 310 that is more proximate to the actuator than are the outrigger arms 334. In certain embodiments, the tongue 330 may optionally include one or more through-holes, for example to facilitate the entry of ultraviolet light through the tongue 330 for UV adhesive curing.

The flexure 330 also includes electrically conductive traces 338 that may be fabricated from a conductive layer 326 of the flexure 320 via a subtractive process such as etching. Alternatively, the electrically conductive traces 338 may be fabricated via an additive process such as deposition of the conductive layer 326 onto the flexure 320. The conductive layer may comprise copper, for example.

The tongue 330 also includes a stand-off 340, for example to help control the spacing and maintain parallelism between a head and the tongue 330 while the head is adhered to the tongue 330. In certain embodiments, the stand-off 340 may be fabricated via a subtractive process from a dielectric layer 324 of the flexure 320. In certain other embodiments, the stand-off 340 may be fabricated via a subtractive process from both the dielectric layer 324 and the conductive layer 326. For example, the stand-off 340 may be fabricated from a polyimide layer of flexure 320, or may include material from both a polyimide layer and a copper layer of flexure 320. The height of the stand-off 340 would be determined by the thicknesses of the corresponding layers of flexure 320. For example, the flexure 320 may employ a dielectric layer thickness in the range 5-15 microns, and may employ a conductive layer thickness in the range 8-20 microns. The stand-off 340 may serve to maintain a minimum separation between the tongue 330 and the head, such minimum separation being determined by the height of the stand-off.

As can be seen in FIG. 4, the dimple 312 of load beam 310 contacts the standoff 340 via a hole 350 that extends through the structural layer 322 but not through the dielectric layer 324. As illustrated, the stand-off 340 comprises a portion of the dielectric layer 324. Because the hole 350 does not extend through the standoff 340 of the dielectric layer, the hole 350 may be referred to as a "blind" hole rather than being a "through" hole. In certain embodiments, the hole 350 preferably has a diameter that is at least 260 microns. Under certain operating or environmental conditions, the contact between the dimple 312 and the dielectric layer 324 can be less likely to fret and/or corrode than would be a contact between the dimple 312 and the structural layer 322. However, if the dielectric layer is too soft, then the pitch and roll compliance of the tongue 330 can be adversely affected. Therefore, in certain embodiments it is preferable that the dielectric layer have a material tensile modulus that is at least 2.5 GPa.

Figure 5:
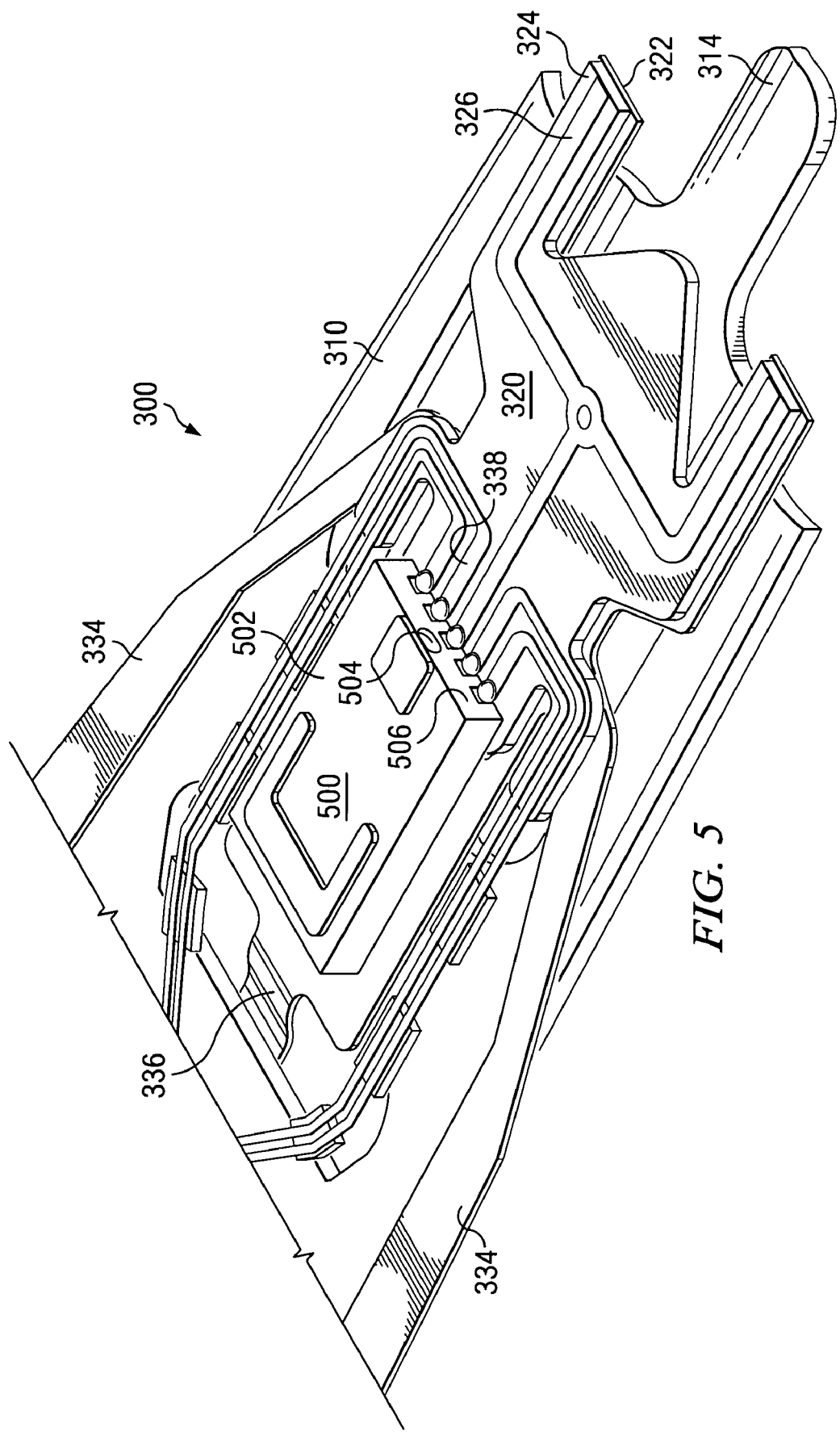
FIG. 5 depicts the suspension assembly of FIG. 3 with a head attached thereto.

As may be seen in FIG. 5, a head 500 may be mounted to the suspension assembly 300 discussed above. The head 500 is used to read and write data from and to a disk. In magnetic recording applications, the head 500 typically includes an air bearing slider 502 and a magnetic transducer 504 located on a trailing face 506 of the air bearing slider 502. The magnetic transducer 504 typically comprises a writer and a read element. The magnetic transducer's writer may be of a longitudinal or perpendicular design, and the read element of the magnetic transducer 504 may be inductive or magnetoresistive. In optical and magneto-optical recording applications (not shown), the head may include a mirror and an objective lens for focusing laser light on to an adjacent disk surface.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

I claim:

1. A suspension assembly comprising:
   a load beam including a protruding dimple; and
   a laminate flexure including a structural layer that is attached to the loadbeam, and a dielectric layer, the laminate flexure including a flexure tongue for mounting a head;
   wherein the flexure tongue includes the structural layer and the dielectric layer and a hole that extends through the structural layer but not through the diectric layer, and wherein the dimple contacts the dielectric layer via the hole.

2. The suspension assembly of claim 1 wherein the laminate flexure further comprises an electrically conductive layer on a side of the dielectric layer that is opposite the structural layer.

3. The suspension assembly of claim 1 wherein the dielectric layer comprises polyimide and the structural layer comprises stainless steel.

4. The suspension assembly of claim 1 wherein the dimple has a protrusion height in the range 65 to 90 microns.

5. The suspension assembly of claim 1 wherein the hole has a diameter that is at least 260 microns.

6. The suspension assembly of claim 1 wherein the loadbeam comprises stainless steel.

7. The suspension assembly of claim 1 wherein the dielectric layer has a material tensile modulus that is at least 2.5 GPa.

8. A head gimbal assembly (HGA) comprising:
   a head including a read transducer;
   a load beam including a protruding dimple; and a laminate flexure including a structural layer that is attached to the loadbeam, and a dielectric layer, the laminate flexure including a flexure tongue on which the head is mounted;

wherein the flexure tongue includes the structural layer and the dielectric layer, and a hole that extends through the structural layer but not through the diectric layer, and wherein the dimple contacts the dielectric layer via the hole.

9. The HGA of claim 8 wherein the laminate flexure further comprises an electrically conductive layer on a side of the dielectric layer that is opposite the structural layer.

10. The HGA of claim 9 wherein the head is in mounted to the flexure tongue in contact with the electrically conductive layer.

11. The HGA of claim 8 wherein the dielectric layer comprises polyimide and the structural layer comprises stainless steel.

12. The HGA of claim 8 wherein the loadbeam comprises stainless steel.

13. The HGA of claim 8 wherein the head is mounted to the flexure tongue in contact with the dielectric layer.

14. The HGA of claim 8 wherein the dimple has a protrusion height in the range 65 to 90 microns.

15. The HGA of claim 8 wherein the hole has a diameter that is at least 260 microns.

16. The HGA of claim 8 wherein the dielectric layer has a material tensile modulus that is at least 2.5 GPa.

* * * * *